March 14, 1961 H. GRIFFON 2,974,785
CONTAINER FOR THE SEPARATE STORAGE AND EXTEMPORANEOUS
MIXING OF CONSTITUENTS IN INJECTABLE SOLUTION
Filed July 8, 1957
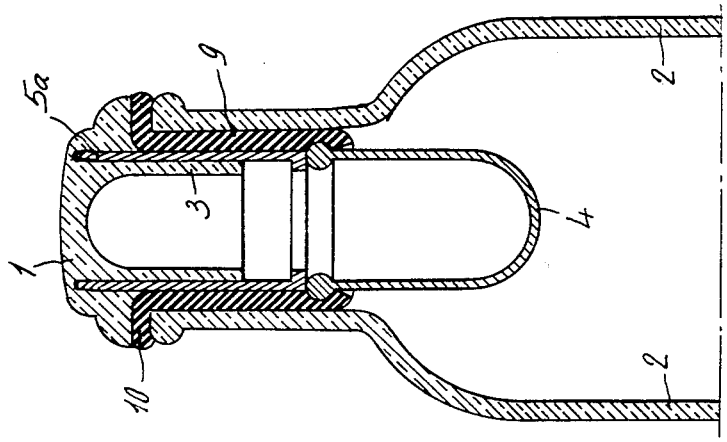
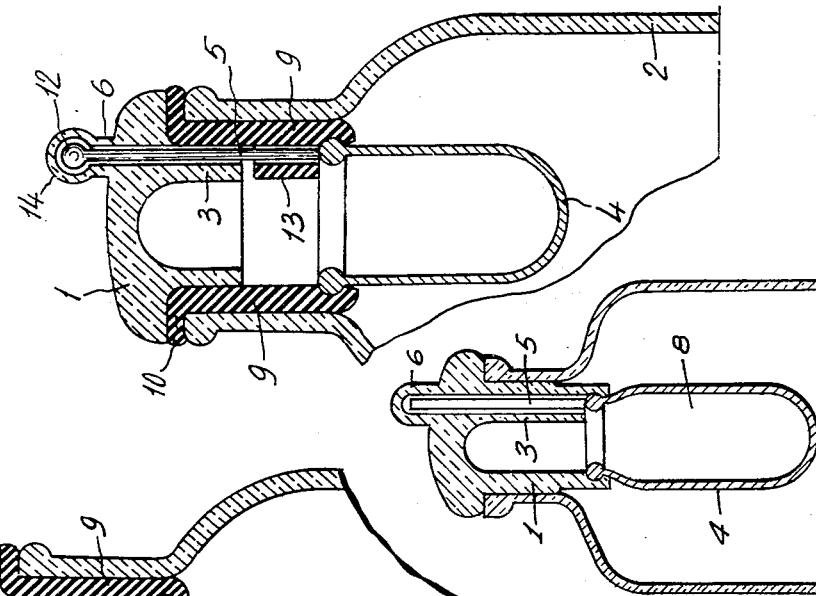
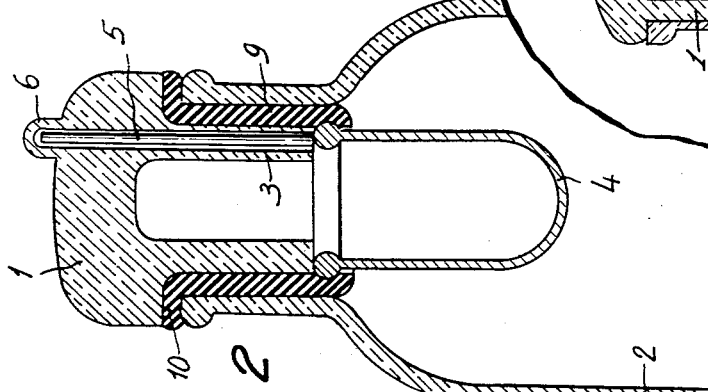
INVENTOR
HENRI GRIFFON
By Michael S. Striker
Agent

United States Patent Office

2,974,785
Patented Mar. 14, 1961

2,974,785

CONTAINER FOR THE SEPARATE STORAGE AND EXTEMPORANEOUS MIXING OF CONSTITUENTS IN INJECTABLE SOLUTION

Henri Griffon, 5 Square de Port-Royal, Paris, France

Filed July 8, 1957, Ser. No. 670,434

Claims priority, application France July 6, 1956

7 Claims. (Cl. 206—47)

Injected medicinal solutions must often be prepared only just prior to being used and, for this reason, the active substance and its vehicle—usually a dissolvent—must be stored separately.

It is current practice to condition to the two substances in separate containers and to effect the mixing by extracting liquid from one recipient with the aid of a syringe and transferring it into the container in which the other substance is kept.

Another method which has been suggested is the use of partitioned containers, each compartment containing a different substance, with means provided for intercommunication between the compartments.

Most of these contraptions are complicated and are also costly to both produce and utilize, particularly insofar as sterilization processing is concerned.

The aim of my invention is to provide a container of this type, especially characterized by the fact that it is a combination of an outer container and an inner container having an upper portion formed by a hollow stopper and a lower portion in frictional engagement with the upper portion. Inside, or running along the length of, the side of the stopper is a push-rod whose lower extremity rests on the aforementioned lower portion of the inner container while its upper end is located inside the stopper, terminating in close proximity to its outer surface.

In operation, all that is required is to exert pressure on this surface, the pressure applied being then transmitted to the lower portion of the inner container through the medium of the push-rod. This pressure, in turn, dislodges the lower portion of the inner container to allow the intermixing of substances in the inner and outer containers. Once this mixing process is complete, the mixture itself can be extracted from the outer container by any conventional method.

My invention is illustrated by the attached drawings, of which,

Fig. 1 gives a partial diagrammatic view, in longitudinal section, of a device according to the invention; and Figs. 2, 3 and 4 illustrate yet another three variations.

Reference to Fig. 1 shows that the device according to my invention is a combination of the inner container 1, 4 and an outer container 2, the former embodying a cavity 8 inside which is stored a medicinal substance of some sort and which is sealed off by frictional engagement between the upper beaded edge of the lower portion 4 of the inner container and the lower edge of the upper inner container portion formed by the flexible stopper 1.

Now, located inside the side of the stopper is a push-rod 5 which extends through the full length of the tubular housing 3 with its lower extremity resting on the lower inner container portion 4 and its upper end terminating in a cap or appendix 6 standing proud of the stopper 1.

In practice, mixture of the substance contained in cavity 8 with that in outer container 2 is obtained by simply pressing on the appendix 6. This pressure is transmitted to lower inner container portion 4 via rod 5 and causes dislocation of the aforesaid container portion 4. The latter drops off and cavity 8 is placed in communication with the inside of container 2.

It is often convenient to be able to see the substance contained in the cavity 8. This is easily rendered practicable by utilizing a transparent outer container and lower inner container portion, as illustrated in Fig. 1.

The lower inner container portion 4 may be made of any suitable material (plastic, glass), preferably transparent, possessing adequate rigidity at least insofar as its upper annular beaded edge is concerned.

The stopper 1 should preferably be made of some elastic material like rubber.

Reference to Fig. 2 shows the device here also as a combination of outer container 2 and inner container 1, 4, the upper portion of the latter itself consisting of three separate components, namely, a sleeve 9 inserted into the neck of the bottle 2, and an upper stopper portion 1 which embodies a tubular housing 3 containing a push-rod 5. Sleeve 9 and lower inner container portion 4 close outer container 2, sleeve 9 providing the inner container with a top open end which is closed by stopper 1.

The cylindrical sleeve 9 incorporates a flat-faced collar at the top and is provided with an annular groove along its lower inner face into which the beaded upper end of lower inner container portion 4 can be inserted.

The diameter of stopper 1 is such that it may be inserted into the sleeve 9.

In the example illustrated in Fig. 3, automatic or semi-automatic mass production considerations have dictated a reduction in the size of that part of upper stopper 1 which is inserted into the sleeve 9. However, the incorporation of the tubular guiding passage 3 for the push-rod in an elastic material such as that constituting the stopper 1 has the disadvantage that, on occasion, push-rod 5 might slip on coming into contact with the edge of the tube/reservoir 4 by virtue of the shortened guiding length.

To overcome this drawback, the sleeve 9 is made to incorporate an auxiliary tube 13 which is, in effect, a prolongation of the push-rod guiding passage in stopper 1 and in which push-rod 5 is guided until it makes contact with the beaded edge of the tube/reservoir 4.

The lay-out illustrated by Figs. 2 and 3 enables the inner container assembly made up of the three portions 1, 9 and 4, to be filled and sterilized while similar operations are carried out with the outer container formed by bottle 2 separately; the inner container assembly 1, 9 and 4 can then be inserted into outer container 2 under sterile conditions. It is also possible to first sterilize the assembled elements 2, 4 and 9 and then add, under sterile handling conditions, the stopper 1 in the last place.

The device in Fig. 4 is identical to that shown in Fig. 2 except in that the push-rod 5 takes the form of a cylinder 5a and that stopper 1 is constituted in some material sufficiently elastic to enable the appendix 6 to be dispensed with.

I claim:

1. A container arrangement comprising, in combination, an inner container having upper and lower portions interconnected only by frictional engagement with each other so that said inner container can be opened by pushing said lower portion thereof downwardly away from said upper portion thereof, said upper portion of said inner container having an open top end portion and including a removable stopper made of a flexible material and closing said top end portion; an outer container closed by said upper portion of said inner container, said lower portion of said inner container communicating with the interior of said outer container; and pushing means located in said upper portion of said inner container, engaging a part of said lower portion of said inner container, and having a top end portion located at said flexible stopper, so that when the operator presses downwardly on said stopper, the downward movement will be transmitted by said pushing means to said part of said lower portion of said inner container to separate the latter from said upper portion of said inner container, so that said lower portion of said inner container will fall into said outer container while the latter remains closed by said upper portion of said inner container, whereby different ingredients in said inner and outer containers will contact each other only when said pushing means is actuated by the operator to separate said lower portion of said inner container from said upper portion thereof.

2. A container arrangement comprising, in combination, an inner container having upper and lower portions frictionally engaging each other and held together only by their frictional engagement so that said inner container may be opened by pushing said lower portion thereof downwardly away from said upper portion thereof, said upper portion of said inner container having an open top end portion and including a removable stopper made of a flexible material and closing said top end portion, and said upper portion of said inner container being provided in its interior with a guide surface extending downwardly to the region of an edge of said lower portion of said inner container; an outer container closed by said upper portion of said inner container, said lower portion of said inner container communicating with the interior of said outer container; and an elongated rigid push member located in said upper portion of said inner container, having a top end portion located at said stopper, extending along said guide surface of said upper portion of said inner container, and engaging said lower portion of said inner container at said region of said edge thereof, so that when the operator pushes downwardly upon the flexible top end portion of said inner container the push member will be moved downwardly along said guide surface to push against said lower portion of said inner container to separate the latter from said upper portion thereof so that the lower portion will then fall into said outer container.

3. In a container arrangement, in combination, an inner container having an elongated upper portion and an elongated lower portion, said lower portion of said inner container being in the form of an elongated tube having a closed bottom end and an open top end and said open top end of said tube being connected only by friction to the lower end portion of said upper portion of said inner container, said upper portion of said inner container having at least a flexible top end portion; an outer container closed by said upper portion of said inner container and said lower portion of said inner container being located within said outer container; and a push member located in said upper portion of said inner container, having a bottom end resting on the top open end of said lower portion of said inner container, and having a top end located at said flexible top end portion of said inner container, so that when the operator depresses said flexible top end portion of said inner container the push member will be pushed downwardly against the top end of the lower portion of said inner container to displace the lower portion of said inner container away from said upper portion thereof so that the lower portion of said inner container will then fall into said outer container.

4. A container arrangement as recited in claim 3, said flexible top end portion of said inner container having an upwardly directed hollow part extending to an elevation higher than any other part of said inner container and said push member having its top end portion extending into said hollow part of said upper portion of said inner container.

5. A container arrangement as recited in claim 3, and wherein the top end of the lower portion of said inner container is in the form of an annular beaded edge, and said upper portion of said inner container having a bottom flexible peripheral portion having an inner annular surface formed with an annular groove which receives said beaded edge.

6. A container arrangement as recited in claim 5, and wherein said push member has a bottom annular end resting on said beaded edge at the top end of said lower portion of said inner container.

7. A container arrangement as recited in claim 3, and wherein said lower portion of said inner container and said outer container are both made of transparent material so that the contents of said lower portion of said inner container as well as said outer container are both visible.

References Cited in the file of this patent
UNITED STATES PATENTS

| | | |
|---|---|---|
| 2,275,567 | Smith | Mar. 10, 1942 |
| 2,289,677 | Perelson | July 14, 1942 |
| 2,615,448 | Fields | Oct. 28, 1952 |
| 2,631,521 | Atkins | Mar. 17, 1953 |
| 2,653,609 | Smith | Sept. 29, 1953 |
| 2,653,611 | Smith | Sept. 29, 1953 |
| 2,661,742 | Hauduroy | Dec. 8, 1953 |
| 2,786,769 | Greenspan | Mar. 26, 1957 |